(12) United States Patent
Kodimer

(10) Patent No.: US 9,160,871 B1
(45) Date of Patent: Oct. 13, 2015

(54) GRAPHICAL USER INTERFACE FOR ILLUSTRATING THE EXISTENCE OF A SUPERSET OF ITEMS IN A LIMITED VIEW WINDOW

(71) Applicants: Toshiba Tec Kabushiki Kaisha, Tokyo (JP); Kabushiki Kaisha Toshiba, Tokyo (JP)

(72) Inventor: Marianne Kodimer, Huntington Beach, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/291,756

(22) Filed: May 30, 2014

(51) Int. Cl.
  *G06F 3/12* (2006.01)
  *H04N 1/00* (2006.01)
  *G06K 15/00* (2006.01)

(52) U.S. Cl.
  CPC ............ *H04N 1/0044* (2013.01); *G06F 3/1292* (2013.01); *H04N 2201/0094* (2013.01)

(58) Field of Classification Search
  CPC .............................. G06F 3/127; G06F 3/1258
  See application file for complete search history.

(56) References Cited

U.S. PATENT DOCUMENTS

| | | | |
|---|---|---|---|
| 6,614,454 B1 * | 9/2003 | Livingston | 715/781 |
| 6,621,590 B1 * | 9/2003 | Livingston | 358/1.15 |
| 2012/0243024 A1 * | 9/2012 | Miyata | 358/1.13 |
| 2013/0003123 A1 * | 1/2013 | Takada et al. | 358/1.15 |

\* cited by examiner

*Primary Examiner* — Dov Popovici
(74) *Attorney, Agent, or Firm* — SoCal IP Law Group LLP; Steven C. Sereboff; Jonathan Pearce

(57) ABSTRACT

Systems and methods for displaying a group of items on a graphical user interface are disclosed. The method includes a user using a mobile device to select a document for printing on a multifunction peripheral; displaying a user interface on the mobile device, wherein the user interface displays a preview of the document and a viewer window, wherein the viewer window animates a list of print settings displaying the last print setting in the list as the first print setting in the viewer window and continuing to scroll through the print settings until the first print setting is shown in the viewer window.

10 Claims, 9 Drawing Sheets

GRAPHICAL USER INTERFACE FOR ILLUSTRATING THE EXISTENCE OF A SUPERSET OF ITEMS IN A LIMITED VIEW WINDOW

BACKGROUND

1. Field

This disclosure relates to user interfaces for mobile devices used in conjunction with multifunction peripherals.

2. Description of the Related Art

A multifunction peripheral (MFP) is a type of document processing device which is an integrated device providing at least two document processing functions, such as print, copy, scan and fax. In a document processing function, an input document (electronic or physical) is used to automatically produce a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together are a unitary whole. Electronic documents will be referred to further herein as documents, unless the context requires some discussion of physical documents, which will be referred to by that name specifically.

In printing, the MFP automatically produces a physical document from an electronic document. In copying, the MFP automatically produces a physical document from a physical document. In scanning, the MFP automatically produces an electronic document from a physical document. In faxing, the MFP automatically transmits via fax an electronic document from an input physical document, which the MFP has also scanned, or from an input electronic document, which the MFP has converted to a fax format.

MFPs are often incorporated into corporate or other organization's networks, which also include various other workstations, servers and peripherals. An MFP may also provide remote document processing services to external or network devices.

Increasingly, users have access to mobile devices, such as mobile telephones, tablets, and mobile computers, and wish to interact with MFPs that are available to them to accomplish tasks. The capabilities and processing power of mobile devices sometimes exceed those available on the MFP itself. As such, user interface tasks and tasks which utilize network access, either for the MFP or in order to perform a function involving transmission or storage of the resulting document may rely upon the mobile device used, rather than direct interaction or operation by the MFP.

The great use of mobile devices has resulted in the creation of apps allowing users to complete many tasks in a business environment such as printing and scanning to an MFP device. Because these devices are set in a business environment, the printing capabilities are vast and therefore the number of settings is great.

Throughout this description, elements appearing in figures are assigned three-digit reference designators, where the most significant digit is the figure number where the element is introduced, and the two least significant digits are specific to the element. An element that is not described in conjunction with a figure may be presumed to have the same characteristics and function as a previously-described element having the same reference designator.

DETAILED DESCRIPTION

Performing document processing operations directly from a mobile device enables users to avoid the hassle of moving documents from the mobile device to a computer suitably adapted to provide document processing requests to an MFP. In many situations, a user may receive a document at his or her mobile device via email. The user may then wish to print or to fax or store that document in a network or cloud location. In other situations, the user interface and processing powers available to a mobile device may provide a better user experience than is available on an MFP. In addition, a user's mobile device may be with them while taking part in meetings, while in his or her office, while at home and while far from any MFP.

Because mobile devices are typically small, and touch-based, the user interface experiences must be well-designed to avoid screen clutter and to provide good experiences for users. Extraneous settings and options are typically hidden. However, because most mobile devices are capable computing devices, user interfaces can be designed in such a way to make the most important options or the most important options given a particular situation or workflow, most obvious.

Description of Apparatus

Figure 1:
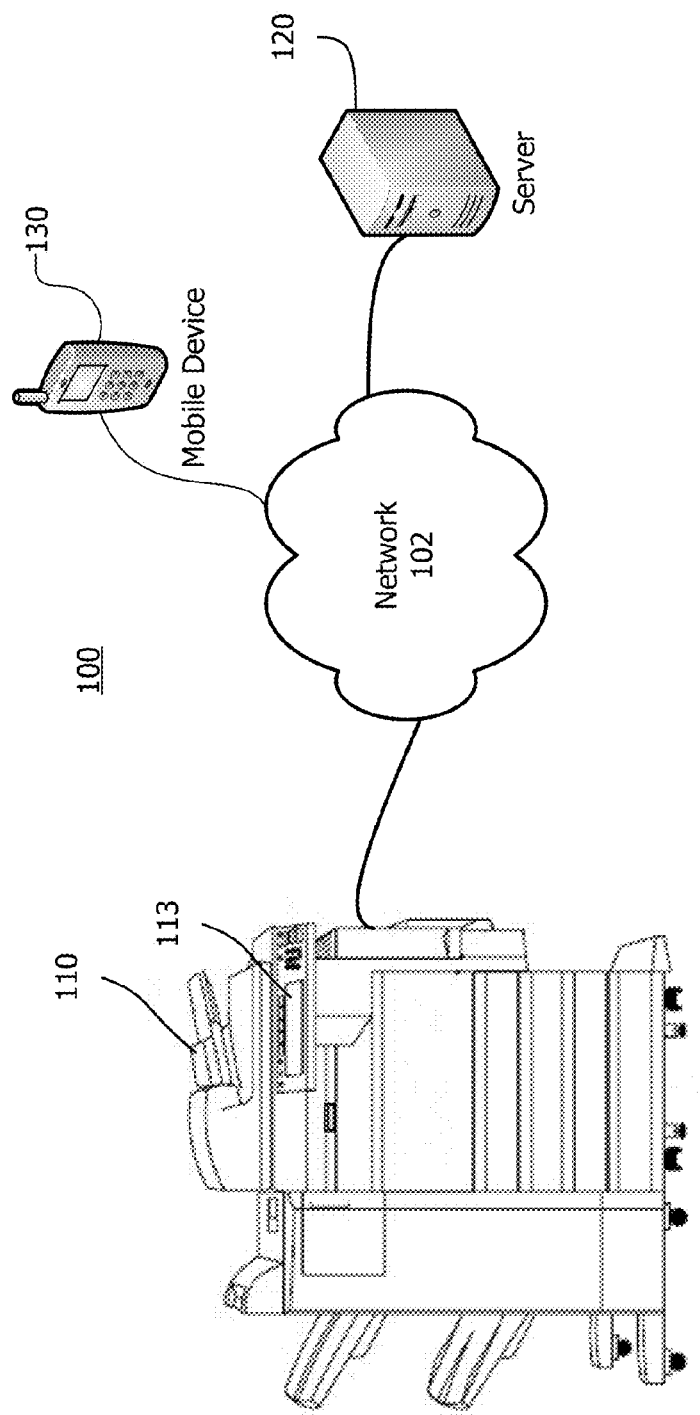
FIG. 1 is a diagram of an MFP system.

Referring now to FIG. 1 there is shown an MFP system 100. The system 100 includes an MFP 110, a server 120, and a mobile device 130, all interconnected by a network 102. The system 100 may be implemented in a distributed computing environment and interconnected by the network 102. An MFP system may include more than one MFP, more than one server, and many more than one mobile devices.

The network 102 may be a local area network, a wide area network, a personal area network, a mobile or telephone network, the Internet, an intranet, or any combination of these. The network 102 may have physical layers and transport layers according to IEEE 802.11, Ethernet or other wireless or wire-based communication standards and protocols such as WiMAX®, Bluetooth®, mobile telephone and data protocols, the public switched telephone network, a proprietary communications network, infrared, and optical.

The MFP 110 may be equipped to receive portable storage media such as USB drives. The MFP 110 includes a user interface subsystem 113 which communicates information to and receives selections from users. The user interface subsystem 113 has a user output device for displaying graphical elements, text data or images to a user and a user input device for receiving user inputs. The user interface subsystem 113 may include a touchscreen, LCD display, touch-panel, alphanumeric keypad and/or an associated thin client through which a user may interact directly with the MFP 110.

The server 120 is software operating on a server computer connected to the network.

The mobile device 130 is a mobile or handheld PC, a tablet or smart phone, a feature phone, smart watch, or other similar device. The mobile device 130 is representative of one or more end-user devices and may be considered separate from the system 100.

Figure 2:
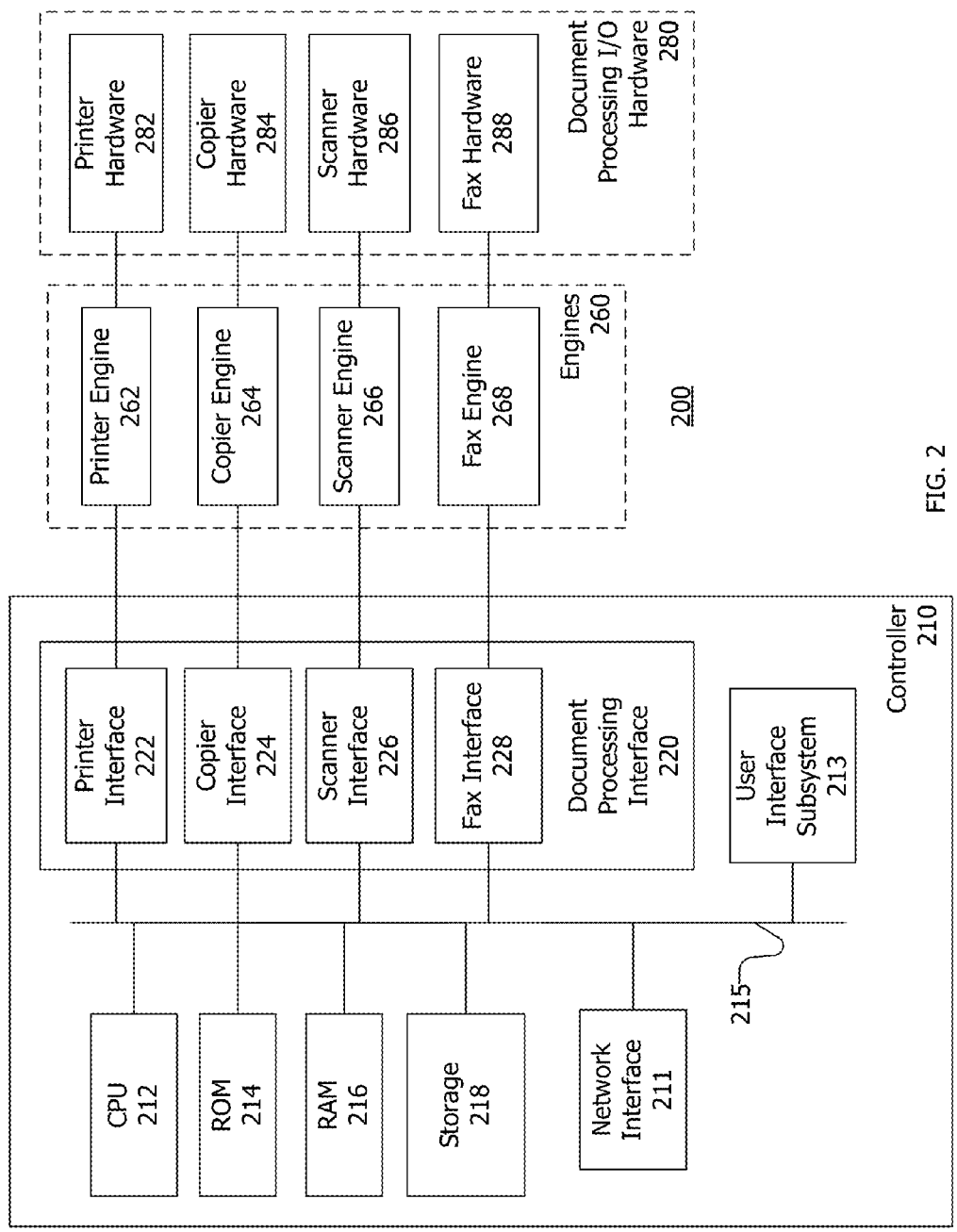
FIG. 2 is a block diagram of an MFP.

Turning now to FIG. 2 there is shown a block diagram of an MFP 200 which may be the MFP 110 (FIG. 1). The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2 there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state. The three storage components, ROM 214, RAM 216 and storage 218 may be combined or distributed in other ways, and may be implemented through SAN, NAS, cloud or other storage systems.

The network interface 211 interfaces the MFP 200 to a network, such as the network 102 (FIG. 1), allowing the MFP 200 to communicate with other devices.

The bus 215 enables data communication between devices and systems within the MFP 200. The bus 215 may conform to the PCI Express or other bus standard.

While in operation, the MFP 200 may operate substantially autonomously. However, the MFP 200 may be controlled from and provide output to the user interface subsystem 213, which may be the user interface subsystem 113 (FIG. 1).

The document processing interface 220 may be capable of handling multiple types of document processing operations and therefore may incorporate a plurality of interfaces 222, 224, 226 and 228. The printer interface 222, copier interface 224, scanner interface 226, and fax interface 228 are examples of document processing interfaces. The interfaces 222, 224, 226 and 228 may be software or firmware.

Each of the printer engine 262, copier engine 264, scanner engine 266 and fax engine 268 interact with associated printer hardware 282, copier hardware 284, scanner hardware 286 and facsimile hardware 288, respectively, in order to complete the respective document processing functions.

Figure 3:
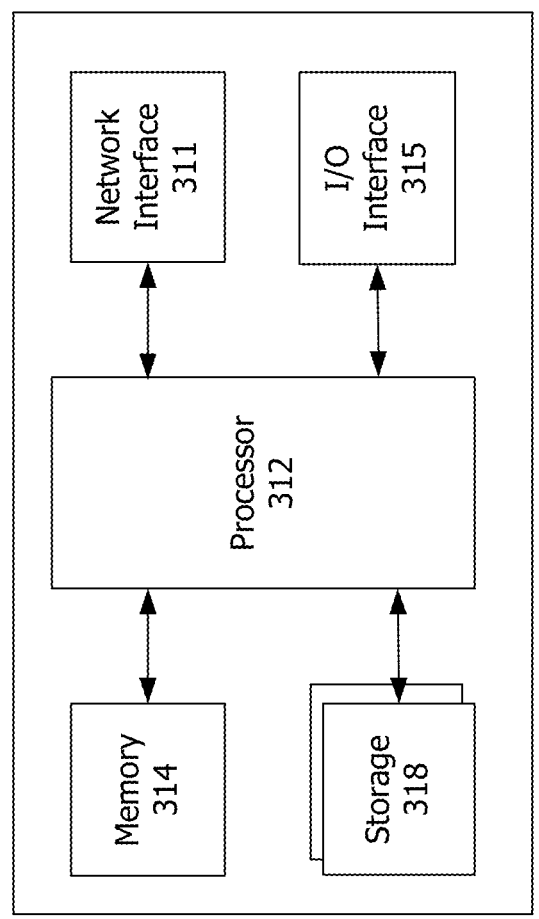
FIG. 3 is a block diagram of a computing device.

Turning now to FIG. 3, there is shown a computing device 300, which is representative of the server computers, client devices, mobile devices and other computing devices discussed herein. The controller 210 (FIG. 2) may also, in whole or in part, incorporate a general purpose computer like the computing device 300. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 has a processor 312 coupled to a memory 314, storage 318, a network interface 311 and an I/O interface 315. The processor may be or include one or more microprocessors, and application specific integrated circuits (ASICs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 provides non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage.

The network interface 311 includes an interface to a network such as network 102 (FIG. 1).

The I/O interface 315 interfaces the processor 312 to peripherals (not shown) such as displays, keyboards and USB devices.

Figure 4:
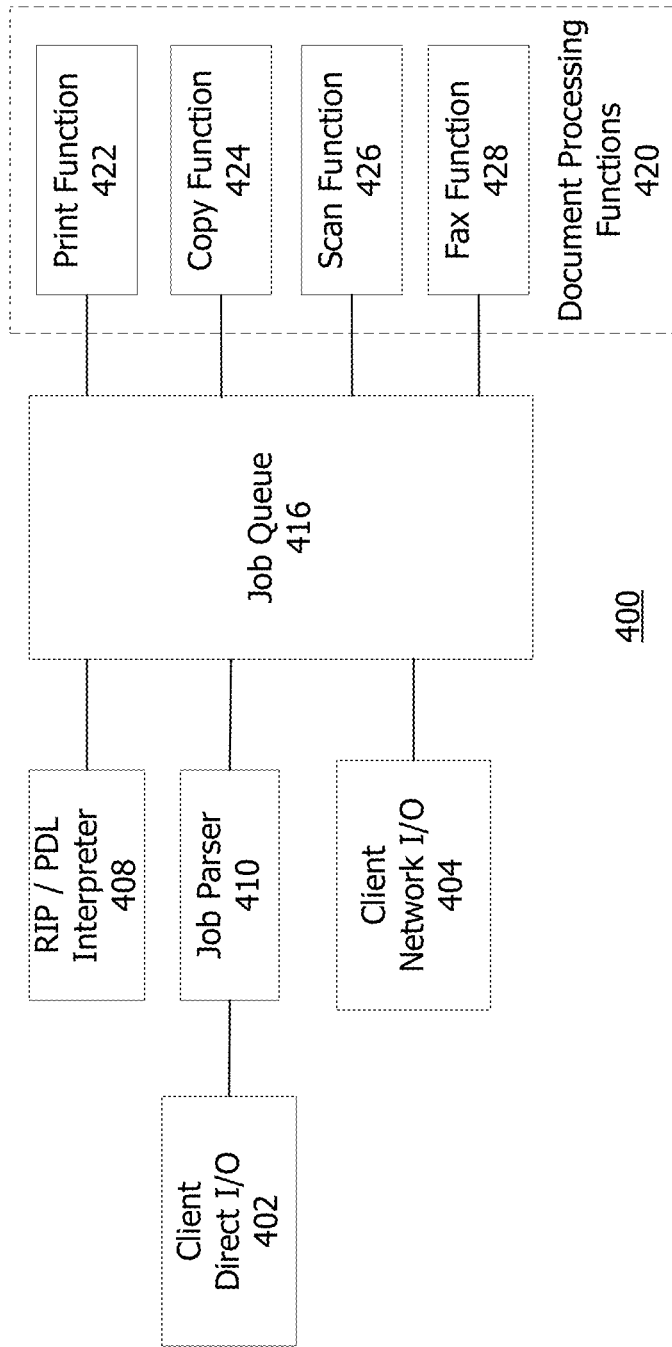
FIG. 4 is a block diagram of a software system for an MFP.

Turning now to FIG. 4 there is shown a block diagram of a software system 400 of an MFP which may operate on the controller 210. The system 400 includes client direct I/O 402, client network I/O 404, a RIP/PDL interpreter 408, a job parser 410, a job queue 416, a series of document processing functions 420 including a print function 422, a copy function 424, a scan function 426 and a fax function 428.

The client direct I/O 402 and the client network I/O 404 provide input and output to the MFP controller. The client direct I/O 402 is for the user interface on the MFP (e.g., user interface subsystem 113), and the client network I/O 404 is for user interfaces over the network. This input and output may include documents for printing or faxing or parameters for MFP functions. In addition, the input and output may include control of other operations of the MFP. The network-based access via the client network I/O 404 may be accomplished using HTTP, FTP, UDP, electronic mail TELNET or other network communication protocols.

The RIP/PDL interpreter 408 transforms PDL-encoded documents received by the MFP into raster images or other forms suitable for use in MFP functions and output by the MFP. The RIP/PDL interpreter 408 processes the document and adds the resulting output to the job queue 416 to be output by the MFP.

The job parser 410 interprets a received document and relays it to the job queue 416 for handling by the MFP. The job parser 410 may perform functions of interpreting data received so as to distinguish requests for operations from documents and operational parameters or other elements of a document processing request.

The job queue 416 stores a series of jobs for completion using the document processing functions 420. Various image forms, such as bitmap, page description language or vector format may be relayed to the job queue 416 from the scan function 426 for handling. The job queue 416 is a temporary repository for all document processing operations requested by a user, whether those operations are received via the job parser 410, the client direct I/O 402 or the client network I/O 404. The job queue 416 and associated software is responsible for determining the order in which print, copy, scan and facsimile functions are carried out. These may be executed in the order in which they are received, or may be influenced by the user, instructions received along with the various jobs or in other ways so as to be executed in different orders or in sequential or simultaneous steps. Information such as job control, status data, or electronic document data may be exchanged between the job queue 416 and users or external reporting systems.

The job queue 416 may also communicate with the job parser 410 in order to receive PDL files from the client direct I/O 402. The client direct I/O 402 may include printing, fax transmission or other input of a document for handling by the system 400.

The print function 422 enables the MFP to print documents and implements each of the various functions related to that process. These include stapling, collating, hole punching, and similar functions. The copy function 424 enables the MFP to perform copy operations and all related functions such as multiple copies, collating, 2 to 1 page copying or 1 to 2 page copying and similar functions. Similarly, the scan function 426 enables the MFP to scan and to perform all related functions such as shrinking scanned documents, storing the documents on a network or emailing those documents to an email address. The fax function 428 enables the MFP to perform facsimile operations and all related functions such as multiple number fax or auto-redial or network-enabled facsimile.

Some or all of the document processing functions 420 may be implemented on a client computer, such as a personal computer or thin client. The user interface for some or all document processing functions may be provided locally by the MFP's user interface subsystem though the document processing function is executed by a computing device separate from but associated with the MFP.

Description of Processes

Figure 6:
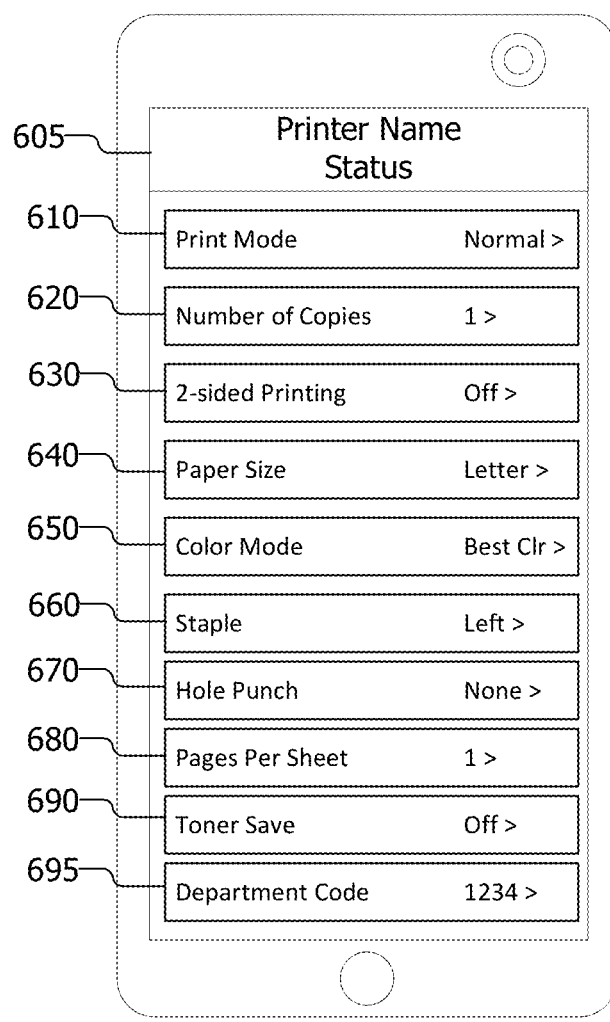
FIG. 6 is a mobile device user interface showing a default action.

Traditionally, after a user selects a document for printing, the user is presented with a long list of settings that the user can modify for the print job. FIG. 6 shows an example of a user interface displaying all of the print settings for the user. As seen in FIG. 6, the user interface first lists the name of the printer and the status at 605. The status of the printer includes Ready, Online, Offline and similar status indicators to identify if the printer can be used. After the printer name, a list of print settings is shown. These include Print Mode 610, Number of Copies 620, 2-sided Printing 630, Paper Size 640, Color Mode 650, Staple 660, Hole Punch 670, Pages Per Sheet 680, Toner Save 690 and Department Code 695. The user interface also lists the selection for each of the print settings. For example, in FIG. 6, print mode is set to Normal at 610; Number of Copies is set to 1 at 620; 2-sided printing is set to Off at 630; Paper Size is set to Letter at 640; Color Mode is set to Best Color at 650; Staple is set to Left Side at 660; Hole Punch is set to None at 670; Pages Per Sheet is set to 1 at 680; Toner Save is set to Off at 690; and Department Code is set to 1234 at 695. Next to each setting, the symbol ">" is shown. This symbol can be used to allow the user to modify the setting for that value. For example, if the user selects ">" for Paper Size at 640, the user may have the option to modify the setting to "Legal" size paper instead of "Letter."

Figure 7:
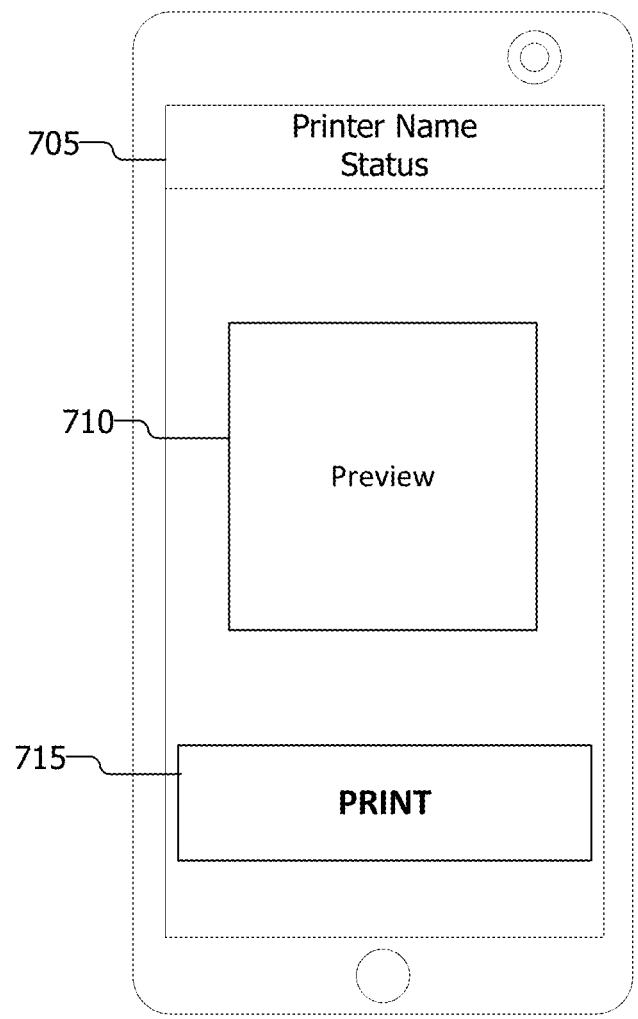
FIG. 7 is a mobile device user interface showing one set of alternative actions.

After the user is presented with a long list of print settings as shown in FIG. 6, the user typically then sees a preview of the document. FIG. 7 shows an example of a user interface just showing a preview of the document. The user interface in FIG. 7 shows the printer name and status at 705. The status will show the same status as described in FIG. 6, namely it will describe the status of the printer. The user interface will also show a preview of the document at 710. The user has an opportunity to confirm the appearance of the document before selecting the PRINT button at 715. After the user selects the PRINT button at 715, the document will be printed based on the print settings selected in FIG. 6, on the MFP identified at 705.

Figure 8:
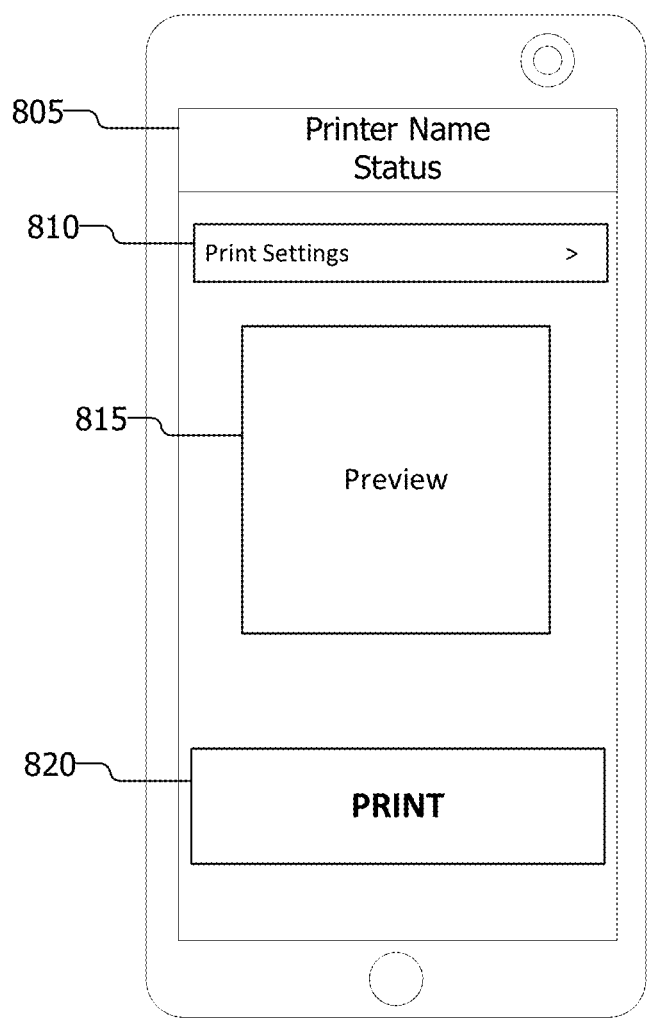
FIG. 8 is a mobile device user interface showing another set of alternative actions.

Alternative systems, try to combine the print settings and preview screen by providing a link to the print settings. FIG. 8 is an example of a user interface using a link to identify the print settings and showing a preview of the document. In FIG. 8, the printer name and status are shown at 805. The status of the printer is the same as described in FIG. 6. A link to the print settings is seen at 810. The user can select the print settings, and then the user likely will be presented with a user interface similar to that seen in FIG. 6. After the user confirms the print settings, the user can return to the screen shown in FIG. 8, and can view the document at 815. When the user has confirmed the appearance of the document and the print settings, the user can select the PRINT button at 820 to print the document. After the user selects the PRINT button at 820, the document will be printed based on the print settings selected by the user using the link, on the MFP identified at 805.

Figure 5:
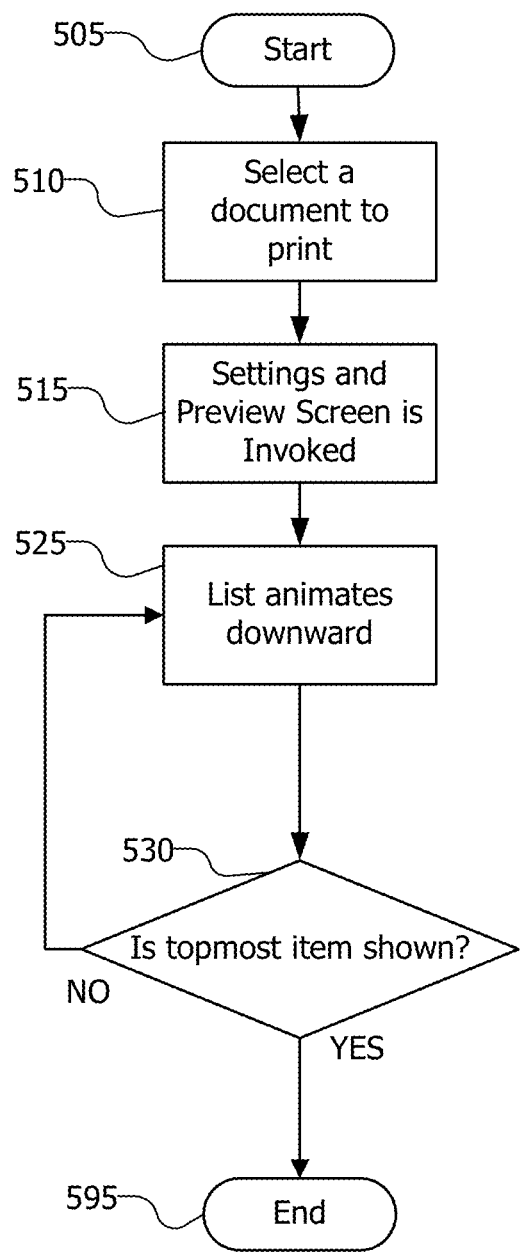
FIG. 5 is a flowchart for the operation of the mobile device software.
Figure 9:
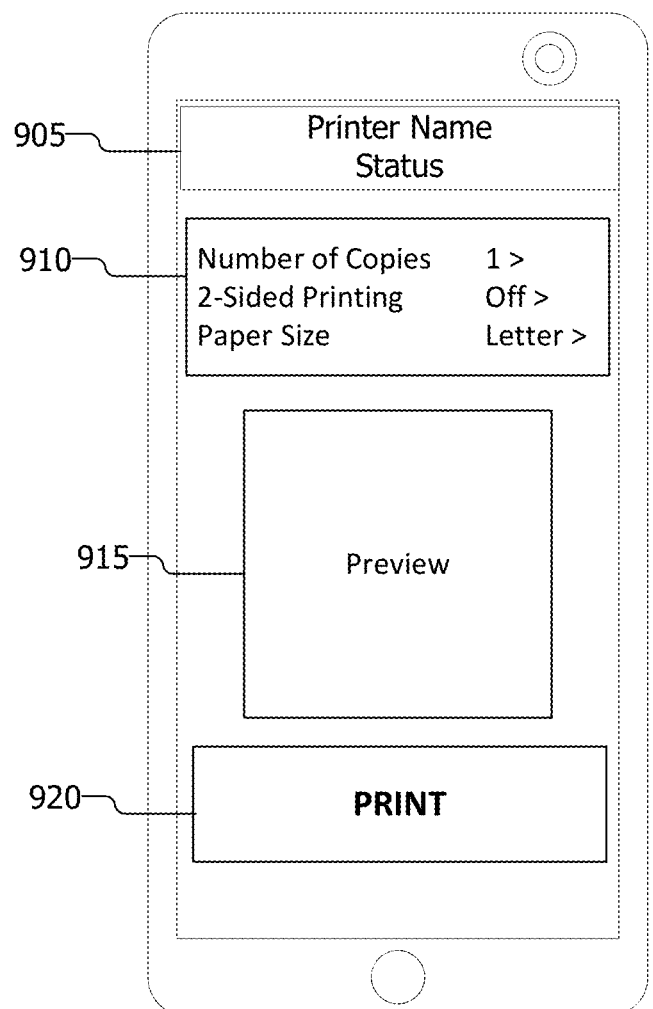
FIG. 9 is a mobile device user interface showing a new default action.

The user interfaces shown in FIGS. 6, 7, and 8 are cumbersome because they force the user to view multiple user interfaces to set the settings for a print job. Instead, it would be convenient for a user to be able to view the print settings and the preview of the document in the same user interface. FIGS. 5 and 9 illustrated this preferred method.

Turning now to FIG. 5, a flowchart for the operation of mobile device software is shown. The flowchart begins at start 505 and ends at end 595. The process may begin once a user has initiated a document processing operation using the mobile device. As shown in the flowchart, the process may repeat an indeterminate number of times.

First, a user uses his mobile device to select a document to print at 510. To select the document, the user may search the data stored on his phone, including documents that have been stored on his phone. Alternatively, a user may use an app on his mobile device that allows the user to connect to a network which includes the MFP that the user will print the document on. The user may connect to the MFP and may search documents that might be stored in the MFP, or that might be stored in a cloud network connected to the MFP. The user may select one of the documents accessible by the MFP for printing.

After the user selects a document for printing at 510, a new user interface is invoked and displayed on the mobile device. This user interface includes both the print settings and a preview of the document selected for printing. FIG. 9 is an example of the print settings and preview user interface that is invoked at 515. In FIG. 9, the graphical user interface displays the printer name and the status of the printer at 905. The status of the printer includes Ready, Online, Offline and similar status indicators to identify if the printer can be used.

In 910, a viewer window appears to the user. This viewer window includes all of the print settings for the user. The viewer window is a scrollable list that is contained within the preview window. When the user interface is invoked, the viewer window animates the list of print settings in reverse order. That is, the viewer window begins by displaying the last setting in the lists first position, and then it scrolls through the list of print settings displaying the preceding one to the last one shown. When the topmost item, or first item, in the list is shown, the animation of the scrollable list stops. After the animation stops, the user can modify the print settings using the viewer window. If the user wants to modify a setting, he can select the ">" symbol to modify the setting. After he modifies the setting, the display will return to the user interface shown in FIG. 9, showing the modified print setting in the viewer window 910. At 915, a preview of the document is shown to the user. In 920, the user can select to print the document to the MFP identified at 905. The document is printed based on the print settings shown in the viewer window 910.

Returning to FIG. 5, after the settings and preview screen is invoked at 515, at 525, the list of print settings is animated and scrolled through in a downward direction in the viewer window, such as 910 in FIG. 9, to display the print settings for the document. After each print setting is displayed, the system determines if it is the topmost item in the list. If it is not, answering "NO" at 530, the process continues displaying the list of items in reverse order in the viewer window until the topmost item is shown at 530.

If the viewer window displays the topmost item, answering "YES" at 530, then the process ends at 595.

CLOSING COMMENTS

Throughout this description the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for displaying a group of items on a graphical user interface comprising:
   a user using a mobile device to select a document for printing on a multifunction peripheral;
   displaying a user interface on the mobile device, wherein the user interface displays a preview of the document and
   a viewer window, wherein the viewer window animates a list of print settings displaying a last print setting in the list as a first print setting in the viewer window and continuing to scroll through the print settings until a first print setting in the list is shown in the viewer window.

2. The method of claim 1 wherein the viewer window animates the list of print settings in a downward direction in the viewer window.

3. The method of claim 2 wherein a user modifies a value for a print setting after the animation of the print settings is completed.

4. The method of claim 3 wherein the viewer window displays at least three print settings of the list of print settings.

5. The method of claim 1 wherein one of the print settings in the list of print settings includes a setting for Paper Size.

6. An apparatus, including a processor and associated memory, the apparatus including software that when executed by the processor causes the processor to:
   a user using a mobile device to select a document for printing on a multifunction peripheral;
   displaying a user interface on the mobile device, wherein the user interface displays
   a preview of the document and
   a viewer window, wherein the viewer window animates a list of print settings displaying a last print setting in the list as a first print setting in the viewer window and continuing to scroll through the print settings until a first print setting in the list is shown in the viewer window.

7. The apparatus of claim 6 wherein the viewer window animates the list of print settings in a downward direction in the viewer window.

8. The apparatus of claim 7 wherein a user modifies a value for a print setting after the animation of the print settings is completed.

9. The apparatus of claim 8 wherein the viewer window displays at least three print settings of the list of print settings.

10. The apparatus of claim 9 wherein one of the print settings in the list of print settings includes a setting for Paper Size.

* * * * *